United States Patent
Lin et al.

(10) Patent No.: US 9,285,551 B2
(45) Date of Patent: Mar. 15, 2016

(54) OPTICAL FIBER CONNECTOR

(71) Applicants: Gloriole Electroptic Technology Corp., Kaohsiung (TW); Shen Zhen Wonderwin Technology Co., Ltd., Shen Zhen, Guang Dong Prov. (CN)

(72) Inventors: Jim Lin, Kaohsiung (TW); Chia-Hua Wu, Kaohsiung (TW)

(73) Assignees: Gloriole Electroptic Technology Corp, Kaohsiung (TW); Shen Zhen Wonderwin Technology Co., Ltd., Shen Zhen, Guang Dong Province (CN)

( * ) Notice: Subject to any disclaimer, the term of this patent is extended or adjusted under 35 U.S.C. 154(b) by 0 days.

(21) Appl. No.: 14/605,408

(22) Filed: Jan. 26, 2015

(65) Prior Publication Data
US 2015/0212278 A1 Jul. 30, 2015

(30) Foreign Application Priority Data
Jan. 28, 2014 (TW) .............................. 103201836 U

(51) Int. Cl.
*G02B 6/38* (2006.01)
(52) U.S. Cl.
CPC ............ *G02B 6/3887* (2013.01); *G02B 6/3869* (2013.01); *G02B 6/3821* (2013.01); *G02B 6/3893* (2013.01)

(58) Field of Classification Search
CPC .. G02B 6/3825; G02B 6/3821; G02B 6/3893; G02B 6/3877; G02B 6/3885; G02B 6/38
USPC .............................. 385/53, 55, 70, 71, 72, 73
See application file for complete search history.

(56) References Cited

U.S. PATENT DOCUMENTS

| 6,550,979 B1 * | 4/2003 | Fleenor et al. ................... 385/78 |
| 2007/0025665 A1 * | 2/2007 | Dean et al. ....................... 385/78 |

* cited by examiner

*Primary Examiner* — Jennifer Doan
(74) *Attorney, Agent, or Firm* — Muncy, Geissler, Olds & Lowe, P.C.

(57) ABSTRACT

An optical fiber connector includes a housing unit, a fiber ferrule unit including a fiber ferrule and a resilient member, a connecting unit, a boot unit and a sleeve unit. The housing unit includes a housing body defining an internal space, and a first engaging member. At least a substantial portion of the fiber ferrule is disposed in the internal space. The resilient member is sleeved on the fiber ferrule. The connecting unit includes a second engaging member and a connecting member. The second engaging member abuts against the resilient member and engages the first engaging member. The boot unit completely receives the connecting member. The sleeve unit is sleeved on the housing unit and the boot unit and covers a juncture therebetween.

7 Claims, 8 Drawing Sheets

OPTICAL FIBER CONNECTOR

CROSS-REFERENCE TO RELATED APPLICATION

This application claims priority of Taiwanese Patent Application No. 103201836, filed on Jan. 28, 2014.

FIELD OF THE INVENTION

The invention relates to an optical fiber connector, more particularly to an optical fiber connector with a sleeve unit sleeved thereon so as to reduce overall size of the optical fiber connector.

BACKGROUND OF THE INVENTION

Optical fiber connectors are widely used in optical transmission and optical networking. Optical fibers may be inserted into an optical fiber connector and be easily connected to communication devices thereby. Among various types of optical fiber connectors, the FC (Ferrule Connector) type, SC (Subscriber Connector) type, LC (Lucent Connector) type, etc. are most widely used. Owing to the miniaturization of modern communication devices, an optical fiber connector with relatively short length is desirable.

Referring to FIGS. 1 and 2, a conventional optical fiber connector 1 includes a housing unit 11, a fiber ferrule unit 12 that has a substantial portion disposed in the housing unit 11, a first connecting unit 13 connected to the housing unit 11, a second connecting unit 16 connected to the first connecting unit 13, a sleeve unit 15 sleeved on the housing unit 11 and the second connecting unit 16, and a tubular boot unit 14 connected to the second connecting unit 16.

The housing unit 11 includes a housing body 110 that defines an internal space 111, and an engaging member 112 disposed on the housing body 110. The fiber ferrule unit 12 includes a fiber ferrule 121 adapted for receiving an optical fiber (not shown), and a resilient member 122 sleeved on the fiber ferrule 121. The first connecting unit 13 has an abutting portion 131 that abuts against the resilient member 122 and that extends into the internal space 111, an engagement portion 132 that is connected to the abutting portion 131 and that engages the engaging member 112, and a connecting portion 133 that is connected to the engagement portion 132 opposite to the abutting portion 131. The second connecting unit 16 includes opposite first and second ends. The first end is sleeved by and received in the sleeve unit 15 and engages the connecting portion 133. The second end is received in the tubular boot unit 14. The sleeve unit 15 abuts against the tubular boot unit 14. With the aforesaid configuration, an overall length of the conventional optical fiber connector 1 is relatively long, which does not meet the miniaturization requirement in the industry.

SUMMARY OF THE INVENTION

Therefore, the object of the present invention is to provide an optical fiber connector that can eliminate the drawback associated with the abovementioned prior art.

According to an aspect of the present invention, there is provided an optical fiber connector that includes a housing unit, a fiber ferrule unit, a connecting unit, a boot unit and a sleeve unit. The housing unit includes a housing body that defines an internal space, and a first engaging member disposed on the housing body. The fiber ferrule unit includes a fiber ferrule and a resilient member. At least a substantial portion of the fiber ferrule is disposed in the internal space. The resilient member is disposed in the internal space and is sleeved on the at least a substantial portion of the fiber ferrule. The connecting unit includes a second engaging member and a connecting member. The second engaging member extends into the internal space, abuts against the resilient member and engages the first engaging member. The connecting member is connected to the second engaging member oppositely of the resilient member. The boot unit completely receives the connecting member of the connecting unit. The sleeve unit is sleeved on the housing unit and the boot unit, and covers a juncture therebetween.

BRIEF DESCRIPTION OF THE DRAWINGS

Other features and advantages of the present invention will become apparent in the following detailed description of the embodiment with reference to the accompanying drawings, of which.

DETAILED DESCRIPTION OF THE EMBODIMENT

Figure 1:
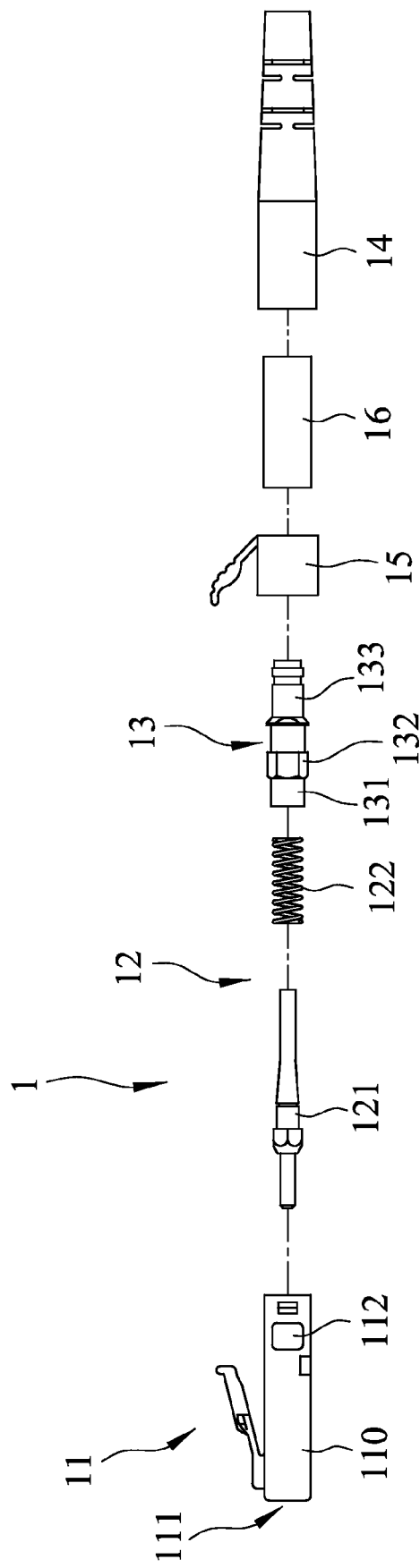
FIG. 1 is an exploded side view of a conventional optical fiber connector.
Figure 2:
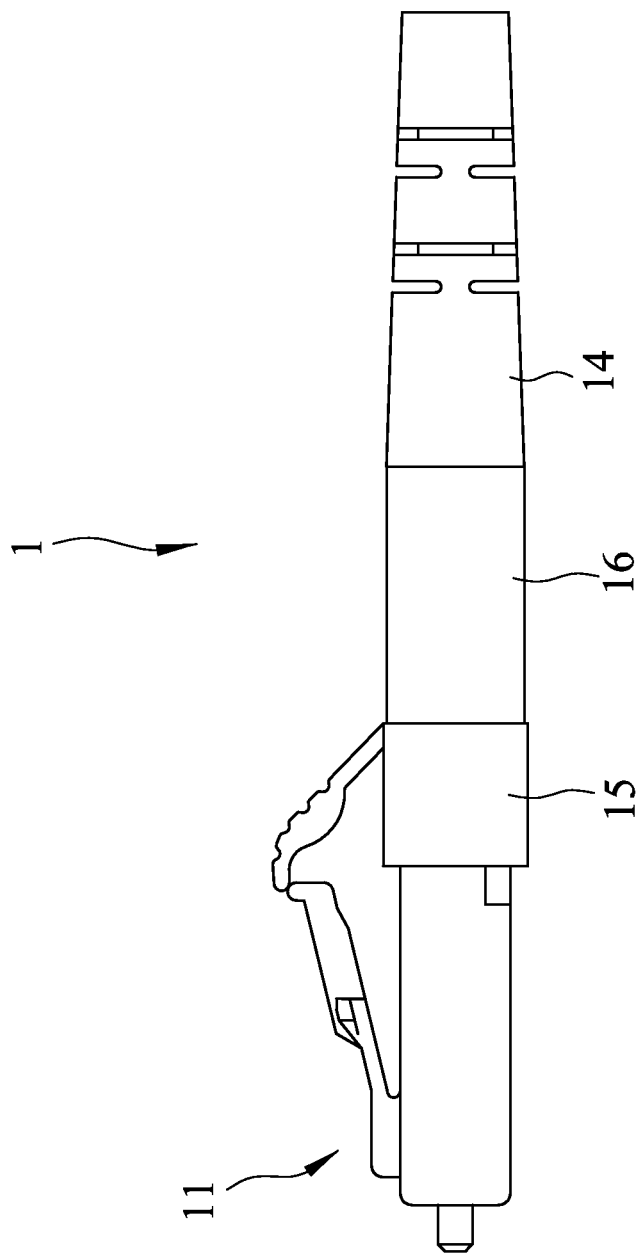
FIG. 2 is an assembled side view of the conventional optical fiber connector.
Figure 3:
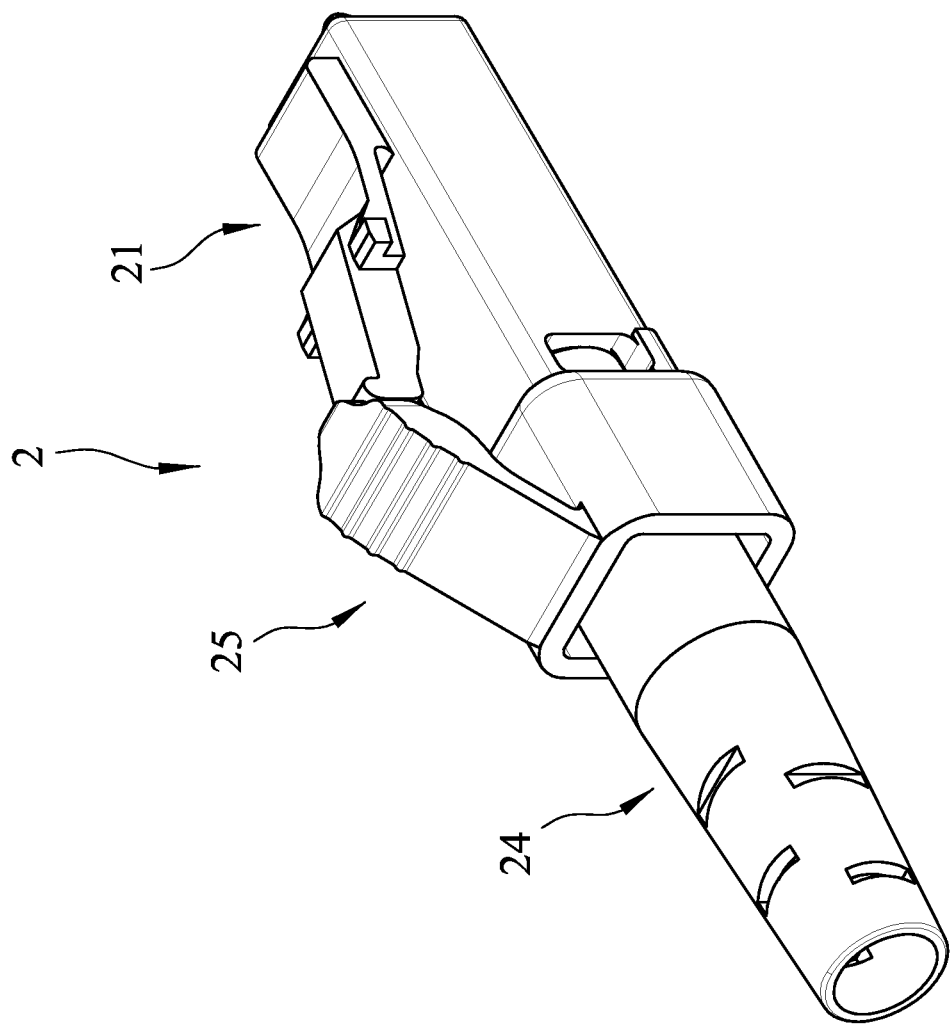
FIG. 3 is a perspective view of an exemplary embodiment of an optical fiber connector according to the present invention.
Figure 4:
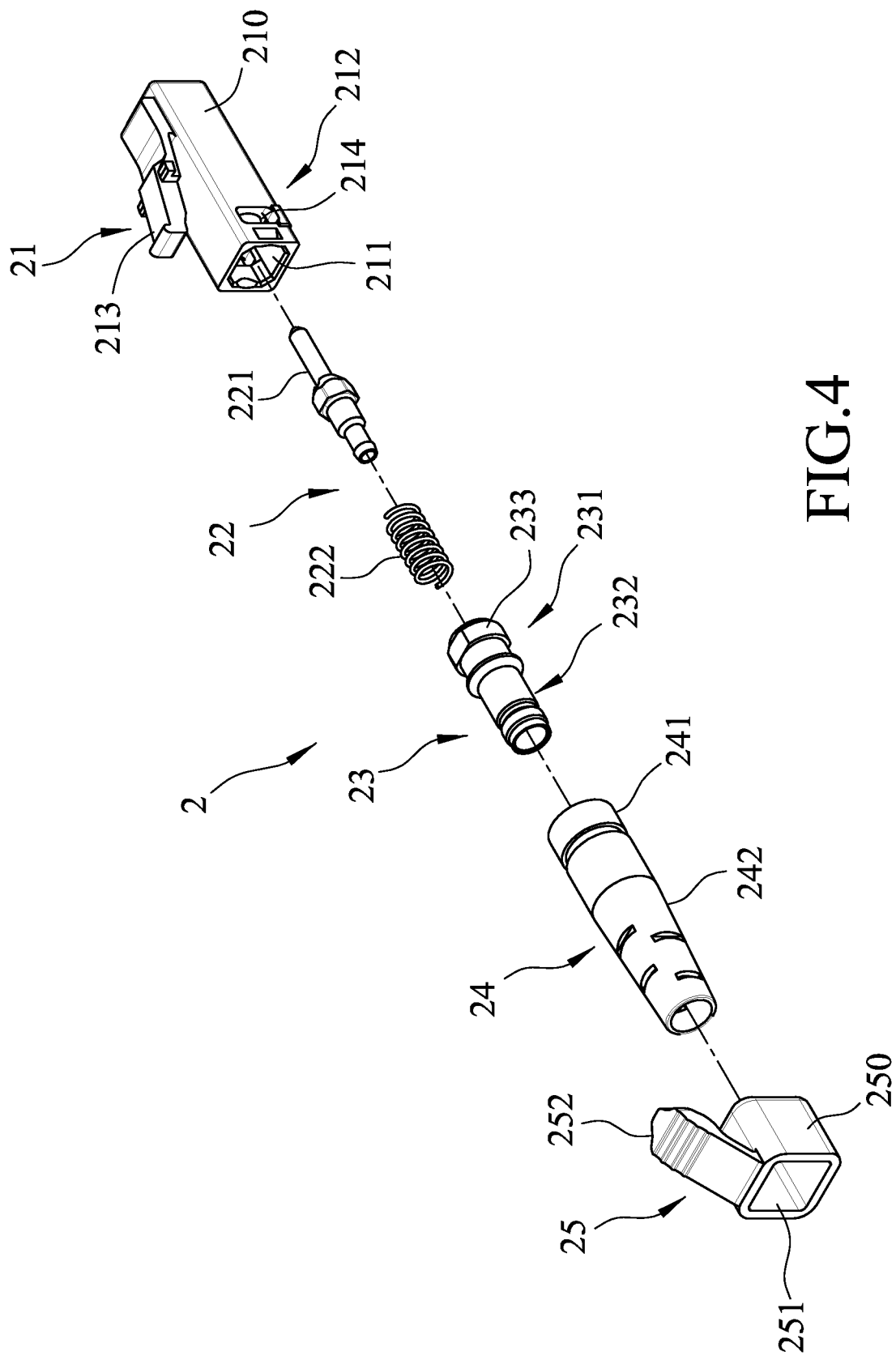
FIG. 4 is an exploded perspective view of the exemplary embodiment.

Referring to FIGS. 3 and 4, an exemplary embodiment of an optical fiber connector 2 according to the present invention includes a housing unit 21, a fiber ferrule unit 22 disposed in the housing unit 21, a connecting unit 23 a boot unit 24, and a sleeve unit 25 sleeved on the housing unit 21 and the boot unit 24 and covering a juncture therebetween.

Figure 5:
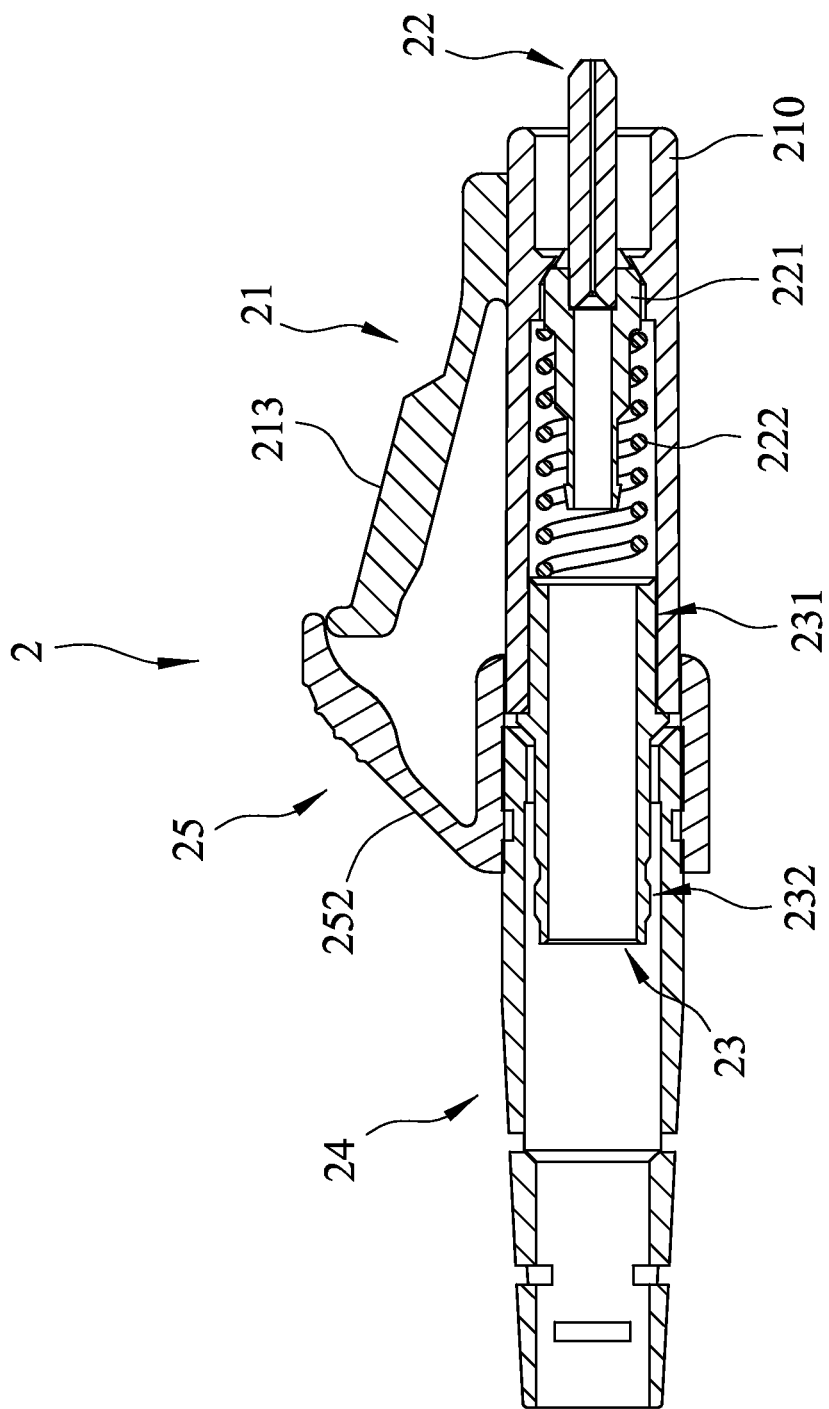
FIG. 5 is a cross-sectional view of the exemplary embodiment.

Referring to FIGS. 4 and 5, the housing unit 21 includes a housing body 210 that defines an internal space 211, a first engaging member 212 disposed on the housing body 210, and a first friction-enhancing member 213 disposed on the housing body 210.

The fiber ferrule unit 22 includes a fiber ferrule 221 and a resilient member 222. At least a substantial portion of the fiber ferrule 221 is disposed in the internal space 211. The resilient member 222 is disposed in the internal space 211 and is sleeved on the at least a substantial portion of the fiber ferrule 221. The resilient member 222 may be a spring.

Figure 6:
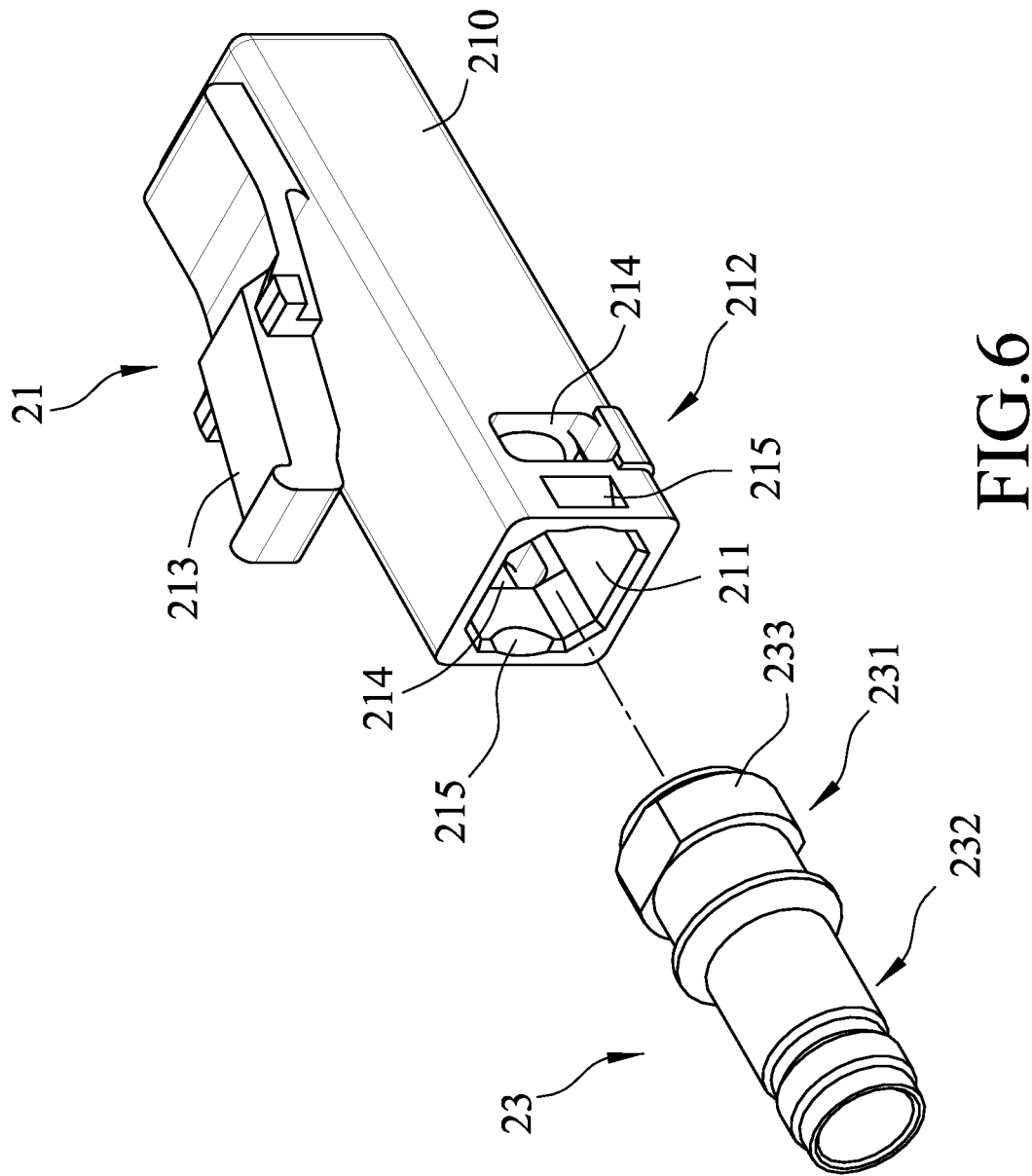
FIG. 6 is a partly exploded perspective view showing a housing unit and a connecting unit of the exemplary embodiment.

The connecting unit 23 includes a second engaging member 231 and a first connecting member 232. The second engaging member 231 extends into the internal space 211, abuts against the resilient member 222, and engages the first engaging member 212. The first connecting member 232 is connected to the second engaging member 231 oppositely of the resilient member 222. Referring to FIG. 6, the first engaging member 212 has a pair of engaging holes 214 that are formed in two opposite sides of the housing body 210, that communicate with the internal space 211, and that are aligned with each other. The second engaging member 231 has an engaging block 233 that engages the engaging holes 214.

The abutment of the second engaging member 231 of the connecting unit 23 against the resilient member 222 would provide a buffering effect during insertion of the second engaging member 231 into the internal space 211 to engage the engaging block 233 with the engaging holes 214. By virtue of a restoring force from the resilient member 222, a user need only apply a force that is enough to disengage the engaging block 233 from the engaging holes 214 to have the connecting unit 23 pushed out of the internal space 211.

The boot unit 24 includes a second connecting member 241 that engages and completely receives the first connecting member 232 of the connecting unit 23, and a boot member 242 that is connected to the second connecting member 241 opposite to the connecting unit 23. The second engaging member 231 and the first connecting member 232 of the connecting unit 23 are respectively received in the housing unit 21 and the boot unit 24 such that there is only the small juncture between the housing unit 21 and the boot unit 24.

The sleeve unit 25 includes a sleeve body 250 that is sleeved on the housing unit 21 and the boot unit 24, and a second friction-enhancing member 252 that is disposed on the sleeve body 250. The first and second friction-enhancing members 213, 252 abut against each other. At least one of the first and second friction-enhancing members 213, 252 is formed with a corrugated portion for increasing friction to prevent a user's hand from slipping, thereby facilitating removal of the sleeve unit 25 from the housing unit 21 and the boot unit 24

Figure 7:
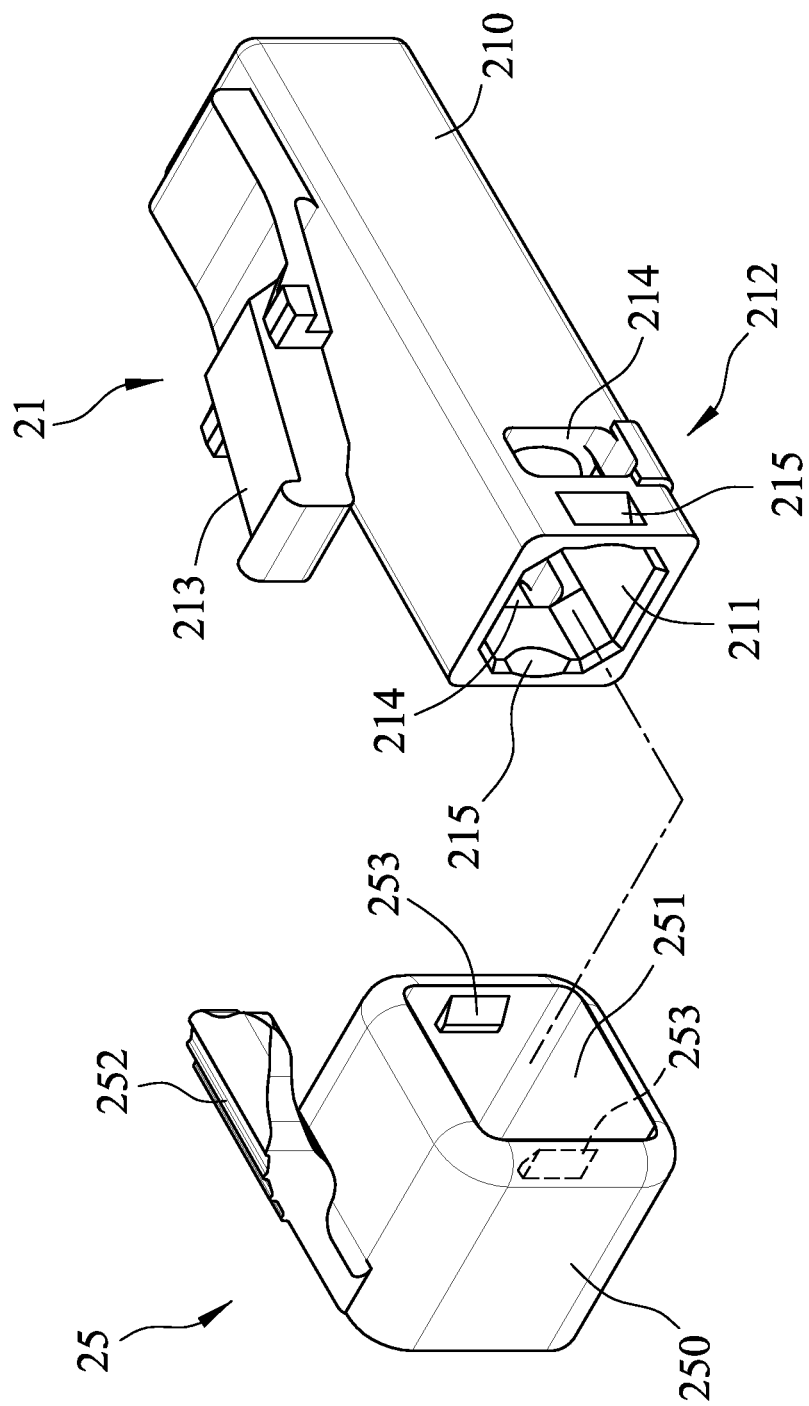
FIG. 7 is a partly exploded perspective view showing the housing unit and a sleeve unit of the exemplary embodiment.

Referring to FIG. 7, the housing body 210 is further formed with a pair of recesses 215 on the two opposite sides thereof. The pair of recesses 215 are spaced apart from the engaging holes 214 and are aligned with each other. The sleeve body 250 has an inner surface 251 that faces the housing unit 21 and the boot unit 24, and a pair of projecting portions 253 that project from the inner surface 251 and that respectively engage the recesses 215 of the housing body 210. In this embodiment, the sleeve unit 25 is sleeved on the housing unit 21 and the boot unit 24 so that the sleeve unit 25 does not affect the overall length of the optical fiber connector 2.

Figure 8:
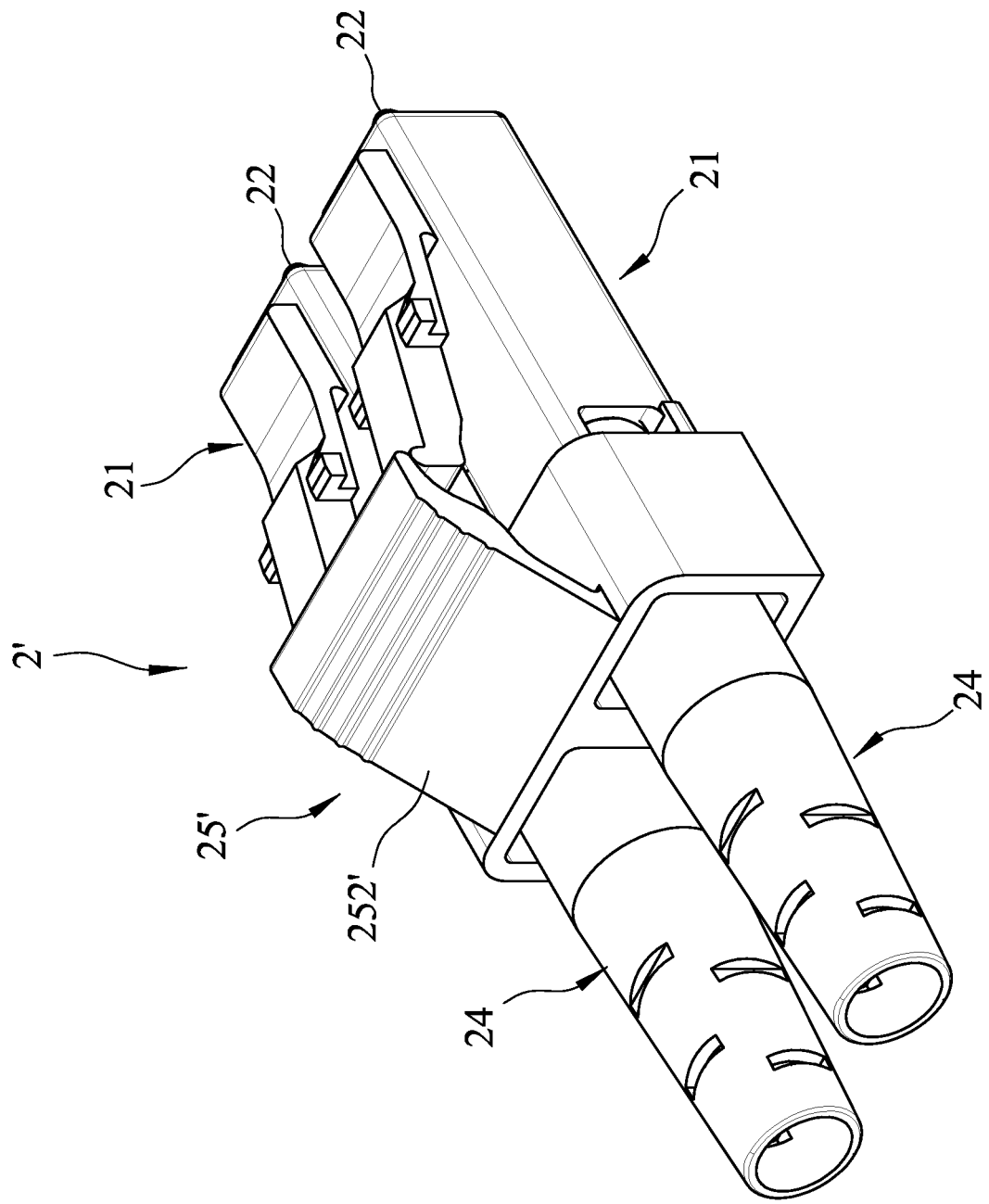
FIG. 8 is a perspective view showing a variation of the exemplary embodiment.

Referring to FIG. 8, a variation of the exemplary embodiment of the optical fiber connector 2' is generally composed of two optical fiber connectors 2 as shown in FIG. 3. To be more specific, the optical fiber connector 2' includes two housing units 21, two fiber ferrule units 22, two connecting units 23 (not shown), two boot units 24 and a sleeve unit 25' that includes two sleeve bodies 250 and a second friction-enhancing member 252'.

To sum up, the sleeve unit 25 is sleeved on the housing unit 21 and the boot unit 24 and covers the juncture therebetween, so that the sleeve unit 25 does not affect the overall length of the optical fiber connector 2. Therefore, compared with the conventional optical fiber connector, the optical fiber connector 2 of this embodiment has a shorter overall length.

While the present invention has been described in connection with what is considered the practical embodiment, it is understood that this invention is not limited to the disclosed embodiment but is intended to cover various arrangements included within the spirit and scope of the broadest interpretation so as to encompass all such modifications and equivalent arrangements.

What is claimed is:

1. An optical fiber connector comprising:
   a housing unit including a housing body that defines an internal space, and a first engaging member disposed on said housing body;
   a fiber ferrule unit including
      a fiber ferrule, at least a substantial portion of said fiber ferrule being disposed in said internal space, and
      a resilient member that is disposed in said internal space and that is sleeved on said at least a substantial portion of said fiber ferrule;
   a connecting unit including a second engaging member that extends into said internal space, that abuts against said resilient member and that engages said first engaging member, and a connecting member that is connected to said second engaging member oppositely of said resilient member;
   a boot unit completely receiving said connecting member of said connecting unit; and
   a sleeve unit sleeved on said housing unit and said boot unit, and covering a juncture therebetween.

2. The optical fiber connector as claimed in claim 1, wherein said housing unit further includes a first friction-enhancing member disposed on said housing body, said sleeve unit including a sleeve body that is sleeved on said housing unit and said boot unit, and a second friction-enhancing member that is disposed on said sleeve body.

3. The optical fiber connector as claimed in claim 2, wherein each of said first friction-enhancing member of said housing unit and said second friction-enhancing member of said sleeve unit is formed with a corrugated portion.

4. The optical fiber connector as claimed in claim 2, wherein said first and second friction-enhancing members abut against each other.

5. The optical fiber connector as claimed in claim 1, wherein:
   said engaging member has a pair of engaging holes that are formed in said housing body, that communicate with said internal space, and that are aligned with each other; and
   said second engaging member has an engaging block that engages said engaging holes.

6. The optical fiber connector as claimed in claim 5, wherein:
   said housing body is further formed with a pair of recesses that are spaced apart from said engaging holes and that are aligned with each other; and
   said sleeve body of said sleeve unit has an inner surface that faces said housing unit and said boot unit, and a pair of projecting portions that project from said inner surface and that respectively engage said recesses of said housing body.

7. The optical fiber connector as claimed in claim 1, wherein said resilient member of said fiber ferrule unit is a spring.

* * * * *